Patented June 15, 1954

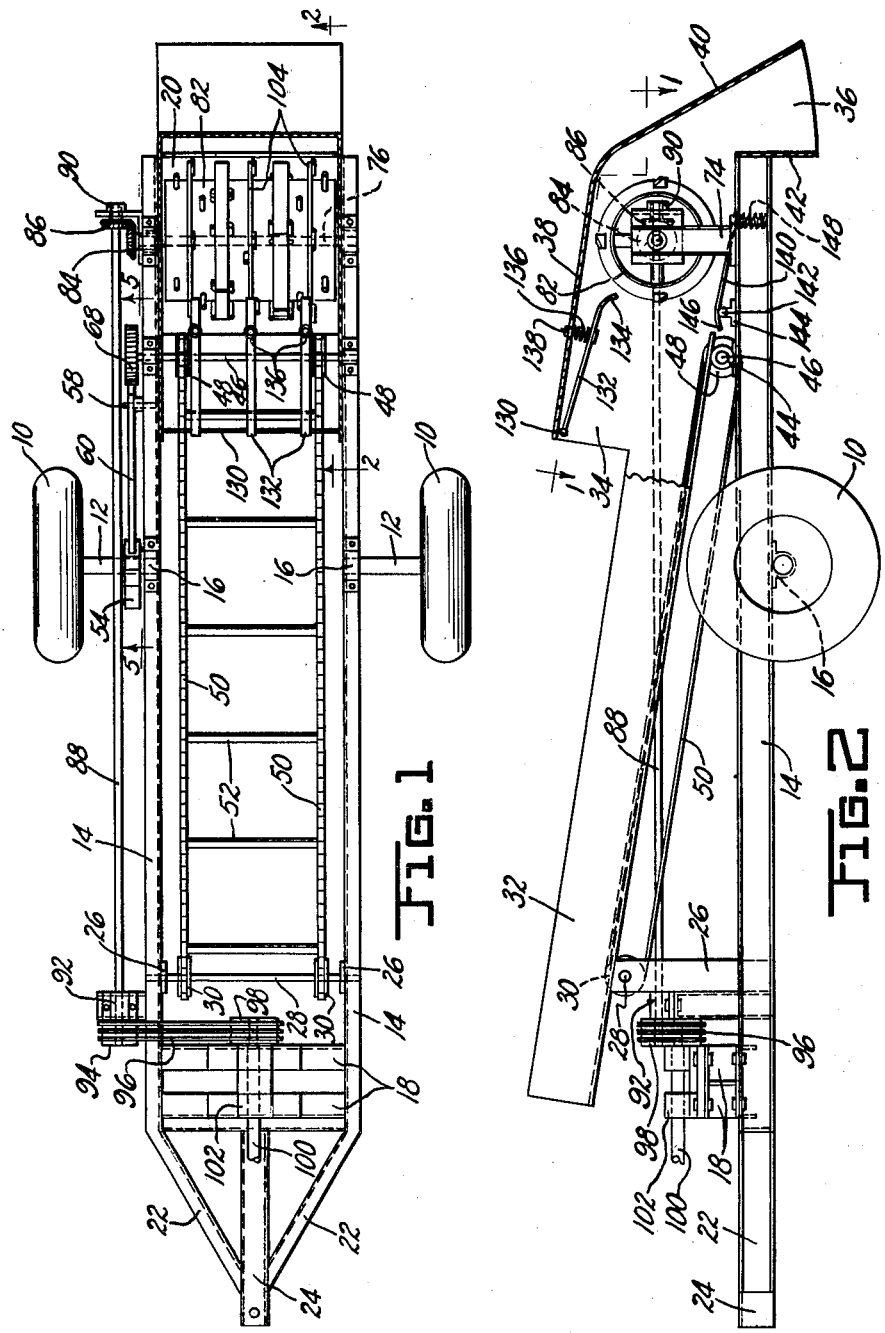

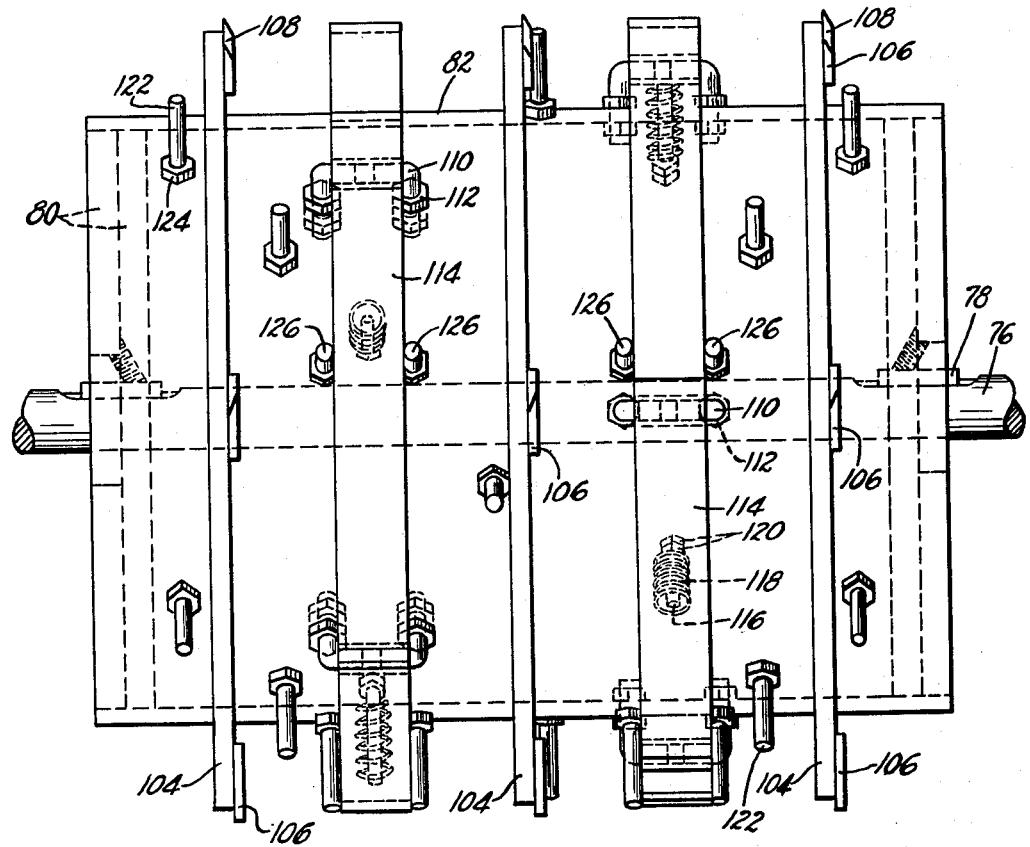
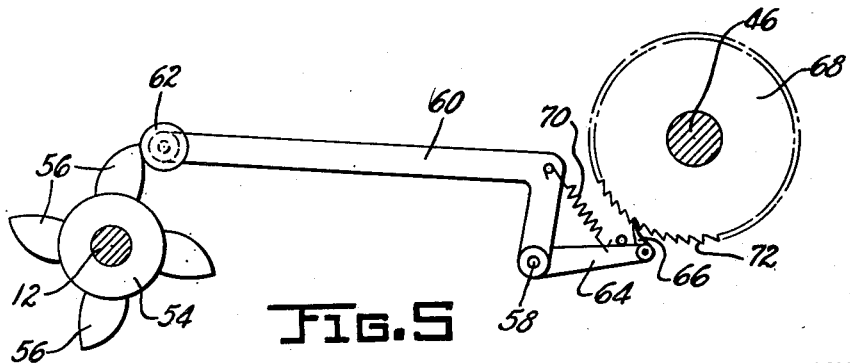

2,681,090

UNITED STATES PATENT OFFICE 2,681,090

DEVICE FOR BREAKING AND SPREADING BALED STRAW

Paul E. Hicks, Buchanan, Ernest G. Hellenga, Three Oaks, and Albert A. Nitz, Berrien Springs, Mich.

Application May 12, 1951, Serial No. 225,976

5 Claims. (Cl. 146—119)

This invention relates to a device for spreading straw.

Straw is spread for various purposes in agricultural work and in building work. One important and widespread usage of straw is its use as a mulch in berry fields, and particularly for the purpose of protecting berry plants of the low-growing type, such as strawberry plants. The mulch is employed to hold moisture and to protect the plants from frost and from sand in the case of heavy rains where plants are planted in sandy soil. The mulch also serves further as a protection by retarding the growth of weeds. Another purpose for which straw is commonly spread is to cover newly poured concrete slabs, such as roads, sidewalks, driveways, and the like. In this instance the straw serves to hold the moisture and prevent rapid drying of the concrete. The straw also serves to hold or protect the road bed in case of rain, and also to protect the concrete from frost.

It has been the common practice heretofore to spread straw by hand. This is a time-consuming operation when performed manually because of the large areas which must be covered. This is particularly true in agriculture where the mulch is applied seasonally and the work must be done in a short period of time. The practice of berry growers usually is to employ a number of transient workers to spread the straw. This necessitates that provision be made to house and care for the transients and, in the event the supply of transient agricultural workers is reduced, as may occur in times of war or other national emergency, the berry grower is faced with a serious problem and with possible loss of a crop if the straw mulch is not applied at the proper time.

Even where an adequate number of workers is available to perform this work, the manual application or spreading of the straw is not wholly satisfactory. Irregular or uneven spread of the straw may result when manually applied; in other words the straw may be applied in clumps in excessive quantity at some points, and at other points in an insufficient amount. One of the reasons for this irregularity is that baled straw is commonly used as a mulch and it is difficult to manually break up the clumps of straw and to secure a uniform dispersion of it.

It is the primary object of this invention to provide a device which will permit straw to be spread rapidly in a uniform concentration and to cover a large area of ground in a short period of time, so that a farmer or berry grower can spread all of the straw required for mulching purposes without requiring the employment of extra help seasonally for this purpose.

A further object is to provide a device of this character having novel means for breaking straw away from a bale uniformly and progressively in a manner which avoids the formation of clumps and which reduces the straw to pieces of small size to facilitate uniformity of spread.

A further object is to provide a device of this character with means for intermittently and progressively feeding baled straw to a separator, for breaking the straw into uniform particles, and for delivering the same or spreading the same uniformly, wherein the driven parts of the device are operated at speeds or rates so correlated with respect to each other that the desired concentration of the mulch is delivered.

Other objects will be apparent from the following specification.

In the drawings:

Fig. 1 is a top plan view of the device with parts shown in section taken on line 1—1 of Fig. 2.

Fig. 2 is a side view of the device with parts shown in section taken on line 2—2 of Fig. 1.

Fig. 3 is an enlarged side view of a cylinder adapted to separate the straw from a bale.

Fig. 5 is an enlarged fragmentary detail view taken on line 5—5 of Fig. 1.

Figure 4:
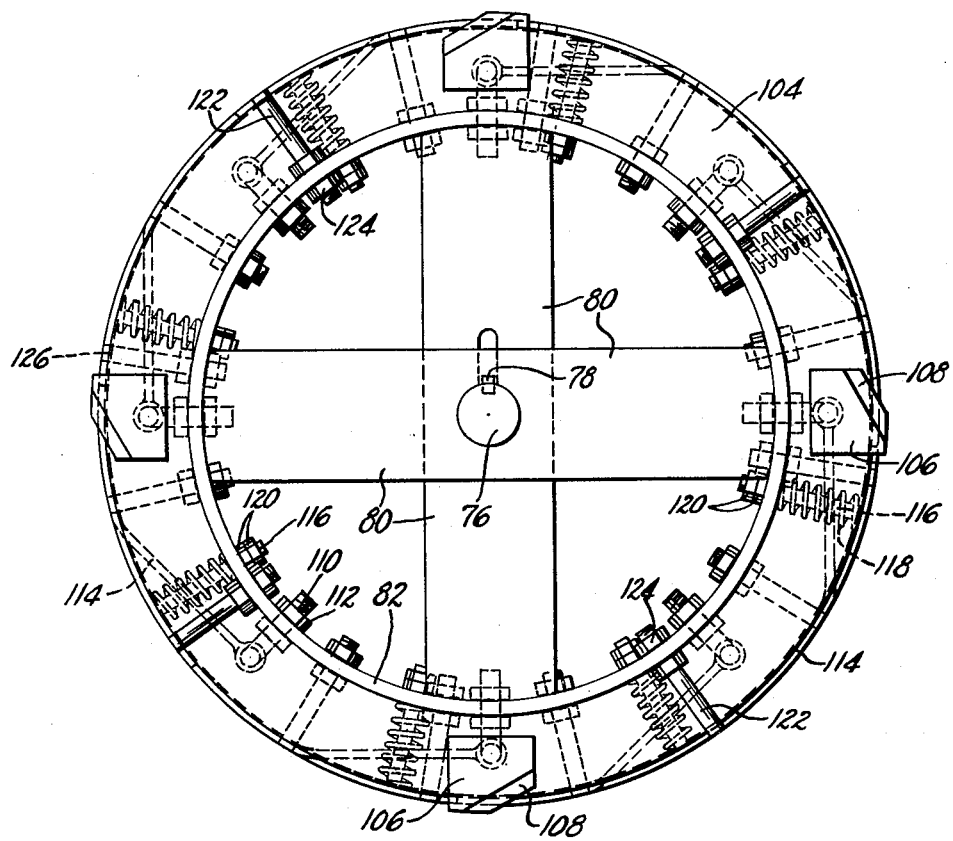
Fig. 4 is an end view of the cylinder shown in Fig. 3.

Referring to the drawing, the numeral 10 designates a pair of ground wheels which are fixedly mounted upon an axle 12 and serve to support a frame of the device. The frame includes longitudinal frame members 14 which carry bearings 16 journaling the axle 12. The longitudinal frame members may be interconnected by transverse frame members, such as the front frame members 18 and rear frame members 20. The front ends of the frame members 14 may converge forwardly at 22 and cooperate with a longitudinal member 24 to provide a tongue or draft arm for connection with the usual drawbar of a tractor or the like.

The frame members 14 support uprights 26 adjacent the forward ends thereof and preferably in rearwardly spaced relation to the front cross members 18. At their upper ends the uprights 26 journal a cross shaft 28 which carries a pair of spaced sprockets 30 in adjacent inwardly spaced relation to the side bars 14. The uprights 26 also carry the front end portions of a pair of elongated vertical plates 32 defining side walls. The side walls 32 are preferably comparatively narrow at their forward ends and incline downwardly and rearwardly, all as seen in Fig. 2. At their rear end portions 34 the side walls are formed of increased height. These side walls extend to the rear end of the longitudinal frame members 14, and portions 36 thereof extend downwardly rearwardly from the rear ends of the frame members 14, as best seen in Fig. 2. A hood or top portion 38 extends between the upper edges of the wall parts 34, the same being inclined, as seen in Fig. 2, and terminating in a rearwardly downwardly inclined wall portion 40 connecting the rear ends or marginal portions of the parts 36 of the side walls. A front transverse substantially vertical wall portion 42 connects the front edges of the depending side plate portions 36 at the rear ends of the frame parts 14.

In rearwardly spaced relation to the uprights 26, and preferably in forwardly spaced relation to the rear ends of the frame 14, are mounted bearings 44 which journal a transverse shaft 46. The shaft 46 has sprockets 48 secured thereto in longitudinal alignment with the sprockets 30 on the shaft 28. As here shown, two sprockets 30 and two sprockets 48 are provided, and chains 50 are trained around said sprockets. The chains are interconnected by crossbars 52 in uniformly spaced relation. The chains run at an inclination preferably corresponding to the inclination of the side walls 32 and are so spaced apart as to support a bale of straw thereon with the cross rails 52 spaced apart a distance substantially equal or slightly greater than the width of a bale. Thus a plurality of bales are supported upon the upper runs of the chains 50; they are confined against lateral displacement by the side walls 32; and they are adapted to be advanced positively upon movement of the chain by reason of the crossbars 52.

A positive drive connection for the chain is preferably provided which is correlated with the speed at which the device travels. An illustrative mechanism of this character is shown in Fig. 5. The axle 12 mounts a star wheel 54 having a plurality of equiangularly related peripheral projections for ears 56. One of the frame members 14 has pivoted thereto at 58 one end of a lever 60. The lever 60 is preferably of substantially L-shape as shown, and has journaled at its free end a roller 62 adapted to roll upon the star wheel 54 and its star points 56 so that the lever 60 is caused to swing in a predetermined arc each time that the roller 62 is engaged by one of the star teeth 56. A lever arm 64 is pivoted on the shaft 58 and, at its free end, mounts a spring pressed detent 66 which is adapted to engage the periphery of a toothed wheel or disk 68 mounted upon the shaft 46. A spring 70 connects the levers 60 and 64 and serves normally to urge them in a predetermined relation to each other. The teeth 72 upon the periphery of the disk 68 are so formed, as illustrated in Fig. 5, that downward swinging of the lever 64 will permit the detent 66 to slide from one tooth to the next without rotating the disk 68, whereas opposite swinging of the lever 64 will shift the detent 66 and with it the disk 68. The swinging of the lever 64 will occur upon each engagement of the roller 62 with a star tooth 56, and, consequently, a step by step rotation of the disk 68 in a clockwise direction as viewed in Fig. 5 will occur. This rotates the shaft 46 through only a small angular increment of movement, with the result that a very slow rate of rotation of the shaft 46 occurs compared to the rate at which the axle shaft 12 and the wheels 10 rotate. This slow or intermittent rotation of the shaft 46 serves progressively to advance the straw bales (not shown) which are carried by the upper run of the chains 50, the same being advanced rearwardly.

The frame members 14 mount uprights 74 adjacent their rear ends. At their upper ends the members 74 journal the opposite ends of a transverse shaft 76. The shaft 76 has keyed thereto at 78 spider members 80 which support the opposite ends of a metal rigid cylindrical member 82. The cylindrical member 82 is preferably of a length to substantially span the space between the side walls 34, and the cylinder 82 is so positioned that it has substantially vertical clearance both with the top wall or hood 38 and the top surface of the frame members 14 and the cross member 20.

Any suitable means may be provided for rotating the cylinder 82. As here illustrated, the shaft 76 mounts a bevel gear 84 with which meshes a bevel gear 86 mounted upon the rear end of a shaft 88 journaled in suitable bearings 90 and 92 at its opposite ends. A pulley 94 is carried by the front end of the shaft 88 and a belt or belts 96 are trained around the pulley 94 and also around a pulley 98 mounted on a shaft 100 journaled by bearings 102 preferably carried by the front cross frame members 18. The shaft 100 is adapted to be connected to a source of power which may consist of the power take-off of a tractor, a separate gasoline engine, an electric motor or the like.

The cylinder 82 is preferably constructed as best illustrated in Figs. 3 and 4. A plurality of rigid annular members or rings 104 are welded or otherwise fixedly secured to the cylinder 82 in spaced symmetrical relation. Thus, as here illustrated, three annular members 104 are provided, the center one of which is positioned substantially mid-length of the cylinder 82, and the outer rings of which are positioned inwardly and equally spaced from the opposite ends of said cylinder. Each of the annular members 104 has welded, bolted or otherwise fixedly secured thereto a plurality of blade members 106. The blade members 106 are preferably equispaced circumferentially of the ring with their outermost portions projecting slightly beyond the outer circumference of the ring members 104. Each blade member is also preferably characterized by a beveled or inclined sharpened edge portion 108 which extends at an angle to the radius of the cylinder and also at an angle to a tangent of the outer circumference of the rings 104 on the radius at which the blade is mounted.

A plurality of circumferential series of presser springs are carried by the cylinder 82. As illustrated in Fig. 2, two such circumferential series are provided, the same being positioned substantially centrally between the annular members 104. Each series is made up of a plurality of elongated leaf spring members, here illustrated as four or more in number. U-bolts 110 are fixedly secured to the drum as by means of nuts 112 threaded on the shanks thereof which pass through suitable openings in the cylinder so as to position the intermediate portion of said U-bolt spaced outwardly from the outer surface of the cylinder 82 and substantially parallel to the axis of said cylinder. The U-bolts 110 are arranged in circumferential alignment equally spaced and each has pivotally connected thereto an eye portion carried by the end of an elongated spring 114. The terminal portions of the springs 114 are preferably bent to arcuate shape and are normally positioned with their outer surfaces projecting slightly radially outwardly beyond the outer circumferential surfaces of the rings 104. The curved or arcuate ends preferably overlie the pivoted ends of adjacent springs so that the arcuate portions of each series of springs cooperate to form a substantially continuous annular bearing surface. The free end portions of each of the springs 114 have fixedly secured thereto, as by welding, pins or studs 116 which extend radially inwardly therefrom and which are encircled by coil springs 118 normally placed under compression, and bear at their outer ends upon the spring portions 114 and at their inner ends against the outer surface of the cylinder 82. The studs 116 pass freely through apertures (not shown) formed in the cylinder 82 and have threaded or otherwise adjustably mounted thereon stops, here shown as nuts 120, which bear against the inner surface of the cylinder 82. The coil springs 118 normally urge the spring plates 114 outwardly to the position determined or limited by the engagement of the stops 120 with the inner surface of the cylinder 82. It will be apparent, however, that the spring members 114 may be depressed against the action of the springs 118 at least to an extent which will position them inwardly of the outer circumference of the annular members 104.

The cylinder 82 mounts a plurality of substantially radially projecting pegs 122 which are fixed thereto by nuts 124 threaded thereon and engaging the inner and outer surfaces of the cylinder 82. The pins may be arranged in any pattern or manner found suitable and preferably are so arranged that adjacent pins are spaced from each other both longitudinally and circumferentially. Thus, as best illustrated in Fig. 3, the pins may be arranged in chevron form, there being a plurality of sets of pins each defining a chevron and the sets being spaced circumferentially. The pins or pegs 122 preferably project from the outer surface of the drum 82 a distance equal to the radial dimension of the rings 104, but it will be understood that such pegs may project a greater distance or a slightly lesser distance if desired. If the pegs project a greater distance, it is preferred that they shall not project beyond the circumferential outline defined by the springs 114 in their normal spring-pressed positions.

Each of the leaf springs 114 will normally have two of the pegs 126 associated therewith at an intermediate portion thereof and serving to define a guide for the spring plate in association with the eye by means of which the spring plate is mounted. Thus the pegs 126 serve as means to guide the swinging of the leaf springs 114 as they are depressed against the action of the coil springs 118 and thereby prevent distortion of the members 114. While the spring members 114 have been defined herein as leaf springs and it is desirable that they shall have a certain resilience and yieldability, nevertheless it will be understood that they normally will retain their shape substantially without flexing and without distortion and are formed of very stiff plates or bars comparable to the plates used in the fabrication of leaf springs for automobiles and the like.

At the upper forward part of the projections 34 of the side walls, is pivoted a cross shaft 130. This shaft pivots a plurality of elongated flat metal rigid finger portions 132 whose opposite ends terminate in downwardly bent or curved parts 134. In spaced relation to their free ends the fingers 132 are pressed upon by coil springs 136 interposed between the same and the hood 38 and serving to urge the fingers downwardly. An elongated retainer 138 passes centrally through each spring 136 and has enlarged heads at its opposite ends adapted to engage the hood 38 and the fingers 132, respectively, to limit the angular displacement of the fingers 132 relative to the hood 38. The retainer will preferably include a headed portion extending freely through an aperture in one or both of the parts 38 and 132. The retainers 138 will preferably be fixed to and project upwardly from the fingers 132 so as to provide a substantially continuous flat bottom surface for each of the fingers from its pivoted end to its curved terminal portion 134. The pivot 130 for the fingers 132 is preferably spaced above the top runs of the chains 50 a distance slightly greater than the height or depth of a straw bale, and the retainer 138 is of such length as to permit an angular positioning of each finger 132 such that the leading edge of a bale will engage same at a point intermediate the length thereof as the bales are inwardly fed into the device. Thus as bales mounted upon the conveyor 50, 52 are advanced toward the rear and toward the cylinder 82, they are engaged by and pressed downwardly by the fingers 132 before they are permitted to come in contact with the cylinder unit. The curved terminal portions 134 of the fingers are particularly important to hold the bales against displacement as they are advanced into contact with the cylinder unit.

Between the discharge end of the conveyor chains 50 and the fixed cross plate 20 is positioned a tilt plate 140 pivoted upon a cross shaft 142 carried by the bearings 144 mounted on the frame members 14. The front end portion 146 of the tilt plate is preferably downwardly bent in curved form as shown. The rear end portion of the tilt plate 140 is supported by coil springs 148. The tilt plate 140 is normally positioned in a plane substantially aligned with the upper runs of the conveyor chains 50, the resilient means of which the springs 148 constitute parts being of such a nature as to permit clockwise downward tilting of that plate relative to the cross shaft 140 but preventing upward tilting of the plate 140 out of line with the upper runs of the conveyor chains 50.

The drive mechanism for the cylinder 82 preferably operates to drive the same in a counterclockwise direction as viewed in Fig. 2. Thus the leading end of the straw bale comes in contact with the downwardly traveling parts of the cylinder. The intermittent slow positive feed of the conveyor chains 50 described above gradually advances or feeds a bale to the cylinder unit and presses it into contact with the parts projecting from the cylinder 82, that is, into contact with the circumferential series of plates 114, the pegs 122 and 126, and the projecting portions of the blades 106. The circumferential series of plates 114 serve with the outer peripheral surfaces of the rings 104 to retard the advance of the bale. The plates 114 are permitted to swing inwardly against the action of their springs 118 incident to the pressure of the advancing bale, thus permitting the cutting action of the blades 106 to occur. The cutting action of the blades, together with the action of the pegs or studs 122, 126, serves to break apart the bale, little by little, and to evenly and uniformly disperse the straw. The pegs carry the straw rearwardly and downwardly. As the straw particles so broken away from the bale are discharged, they fall upon the tilt plate 140 and thence slide rearwardly across the back plate 20 for discharge through the spout or mouth defined by the wall parts 36, 40 and 42. The last named parts define in effect a discharge spout which can be positioned at a low level and thus protect the straw particles from wind currents until the straw is only a short distance above the ground. Thus wind currents cannot affect adversely the uniform spreading of the straw in a strip of desired width at a desired point unless such winds are very strong.

In the event rocks or other heavy articles should be confined within a bale, or in the event a compact bale part should break away and the same should have a tendency to clog the space between the tilt plate and the cylinder, the tilt plate 140 will tilt downwardly rearwardly against the action of the springs 148 to accommodate the release of the foreign material and thus avoid damage to the operating parts of the device.

While the preferred embodiment of the invention has been illustrated and described herein, it will be understood that changes may be made in the construction of the device within the scope of the appended claims without departing from the spirit of the invention.

We claim:

1. In combination, a vehicle, a straw separator rotatably carried by said vehicle and including a drum with radial projections and cutting blades, means for rotating said separator, and means carried by said vehicle for feeding straw bales toward and into engagement with said separator in a path transverse of the axis of rotation of the separator, said vehicle having a portion defined by side, top and bottom panels and having a front access opening adapted to receive said feed means and straw bales therethrough and having a rear discharge opening, said separator being positioned in said portion between said openings, and an elongated finger pivoted between said side panels on an axis above and transverse of the path of travel of a bale on said feeding means toward said separator, said finger being pivoted at its leading end and normally inclined relative to the path of a bale for engagement of a trailing portion thereof by a bale, the rear trailing portion of said finger being bent downwardly adjacent to said separator.

2. In combination, a vehicle, a drum rotatably carried by said vehicle and having radial projecting cutters, means for rotating said separator, and means carried by said vehicle for feeding straw bales to said separator in a path transverse of the axis of rotation of the separator which confronts said bale, said vehicle having a portion defined by side, top and bottom panels and having a front access opening adapted to receive said feed means and straw bales therethrough and having a rear discharge opening, said separator being positioned in said portion between said openings, and an elongated finger pivoted between said side panels on an axis above and transverse of the path of travel of a bale on said feeding means toward said separator, said finger being pivoted at its leading end and normally inclined relative to the path of a bale for engagement of a trailing portion thereof by a bale, the rear trailing portion of said finger being bent downwardly adjacent to said separator, and spring means pressing said finger downwardly toward said normal inclined position.

3. A straw separator comprising a vehicle, a drum journaled on said vehicle on an axis transverse of the path of said vehicle, means for rotating said drum, radial projections on said drum including cutting blades, means on said vehicle for feeding straw bales toward said drum for engagement thereof by said projections, a spacer member carried by and encircling said drum and engageable with a bale to limit the depth of penetration of said bale by said projections, a stop cooperating with said spacer and a spring normally urging said spacer radially outwardly from said drum and against said stop.

4. A straw separator comprising a vehicle, a drum journaled on said vehicle on an axis transverse of the path of said vehicle, means for rotating said drum, radial projections on said drum, means on said vehicle for feeding straw bales toward said drum for engagement thereof by said projections, a ring encircling said drum and having its outer periphery spaced from the axis of the drum substantially equal to the spacing between the tips of the projections and the axis of the drum, and a plurality of circumferentially spaced blades carried by said ring and projecting radially therefrom.

5. A straw separator comprising a vehicle, a drum journaled on said vehicle on an axis transverse of the path of said vehicle, means for rotating said drum, radial projections on said drum, means on said vehicle for feeding straw bales toward said drum for engagement thereof by said projections, a circumferential series of elongated curved plates each pivoted at one end to said drum and spring means outwardly urging the opposite ends of said plates to a position spaced from said drum substantially equal to the extent said projections extend outwardly from said drum.

References Cited in the file of this patent

UNITED STATES PATENTS

| Number | Name | Date |
|---|---|---|
| 692,601 | Berger | Feb. 4, 1902 |
| 1,213,192 | Heebner | Jan. 23, 1917 |
| 1,259,089 | Felcyn | Mar. 12, 1918 |
| 1,441,128 | Sloat | Jan. 2, 1923 |
| 1,448,644 | Wallace | Mar. 13, 1923 |
| 1,844,279 | Gossard | Feb. 9, 1932 |
| 1,946,807 | Neighbour | Feb. 13, 1934 |
| 2,305,159 | Heckman et al. | Dec. 15, 1942 |
| 2,528,232 | Krause | Oct. 31, 1950 |
| 2,549,876 | Williamson | Apr. 24, 1951 |
| 2,561,069 | Peterson | July 17, 1951 |

FOREIGN PATENTS

| Number | Country | Date |
|---|---|---|
| 303,178 | Germany | Jan. 26, 1918 |